United States Patent [19]
Zemel et al.

[11] 3,937,941
[45] Feb. 10, 1976

[54] METHOD AND APPARATUS FOR PACKED BCD SIGN ARITHMETIC EMPLOYING A TWO'S COMPLEMENT BINARY ADDER

[75] Inventors: David Larry Zemel, Palo Alto; Robert Gerald Kirk, Danville, both of Calif.

[73] Assignee: Signetics Corporation, Sunnyvale, Calif.

[22] Filed: Nov. 27, 1974

[21] Appl. No.: 527,605

[52] U.S. Cl. ............................................. 235/159
[51] Int. Cl.² ...................................... G06F 7/385
[58] Field of Search ................................... 235/159

[56] References Cited
UNITED STATES PATENTS
3,304,418  2/1967  Perotto et al.................. 235/159 X

*Primary Examiner*—R. Stephen Dildine, Jr.
*Attorney, Agent, or Firm*—Flehr, Hohbach, Test, Albritton & Herbert

[57] ABSTRACT

Disclosed is a BCD arithmetic method and BCD arithmetic apparatus for use in a data processing system. The binary adder included in a data system for binary arithmetic operations is additionally utilized in the invention to provide BCD sign-magnitude addition and subtraction of packed digits. The apparatus is utilized to carry out the method steps of preconditioning one of the operands by adding a predetermined binary number to each BCD digit, performing a binary addition, and applying a decimal adjust to form the decimal arithmetic sum. Subtraction steps include performing a two's complement binary subtraction of each BCD digit, and applying a decimal adjust to form the decimal difference. The method and apparatus may be utilized with other base number systems having members which may be represented by a binary sequence that does not use all of the $2^N$ binary combinations in the set.

6 Claims, 3 Drawing Figures

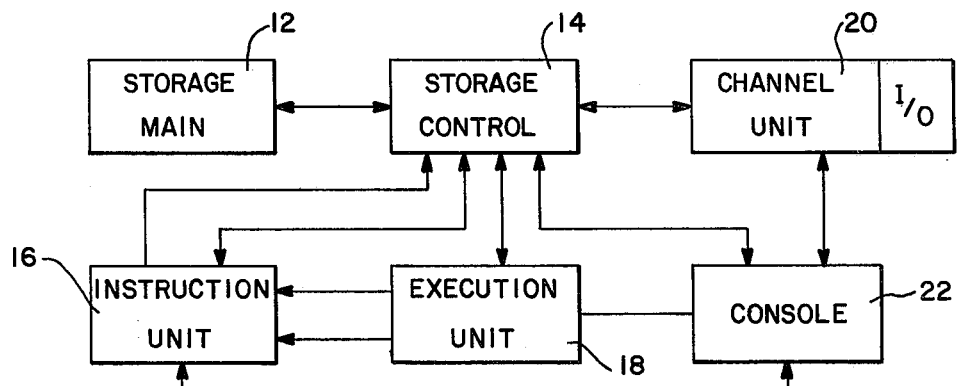
FIG.—1
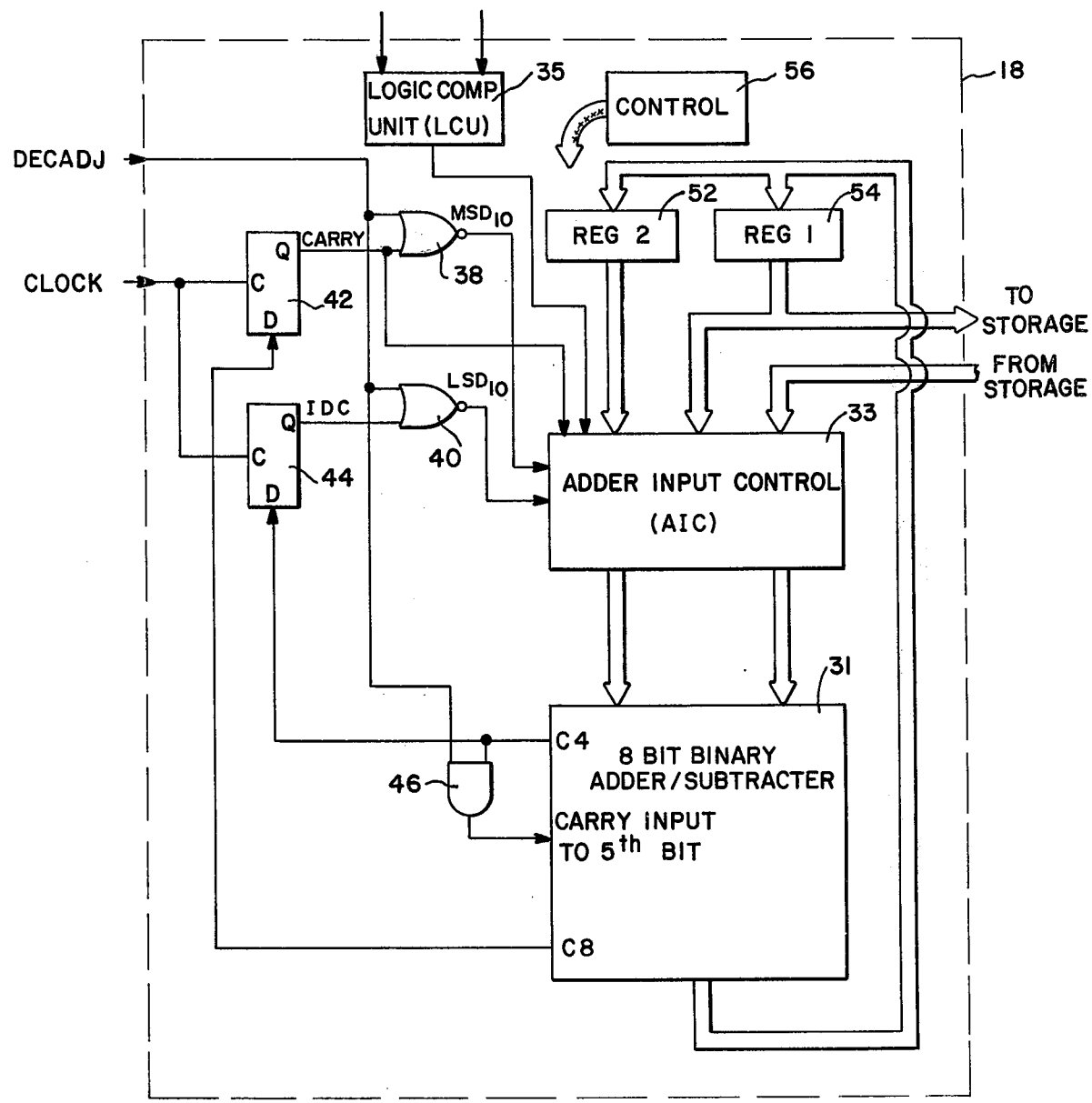
FIG.—2

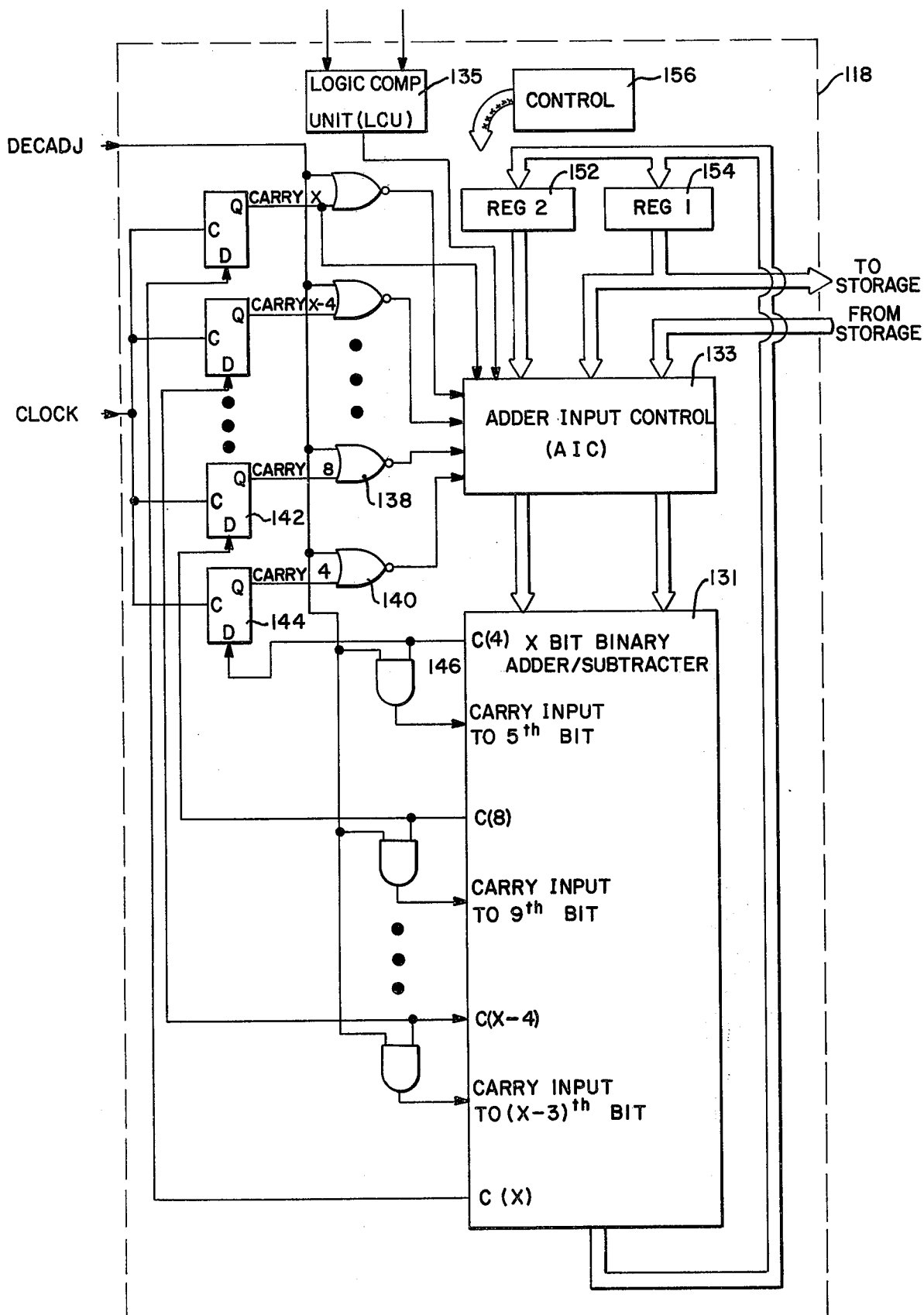
FIG.—3

//3,937,941//

METHOD AND APPARATUS FOR PACKED BCD SIGN ARITHMETIC EMPLOYING A TWO'S COMPLEMENT BINARY ADDER

BACKGROUND OF THE INVENTION

The present invention relates to the field of data processing systems, specifically to the field of arithmetic apparatus and methods for performing arithmetic operations within data processing systems.

Decimal arithmetic operations have been implemented in prior art large scale digital processing systems. However, the apparatus used in large scale systems requires expensive hardware and requires extensive space. Decimal arithmetic operations have been performed within relatively small scale systems in microprocessors which generally may be two orders of magnitude smaller in scale then large scale systems. Because of the small size of microprocessors the hardware for implementing decimal arithmetic functions must be proportionately smaller and less elaborate than their counterparts in large systems. Prior art microprocessors utilize nine's or ten's complement addition and subtraction making addition and subtraction excessively complex to implement and understand, and difficult to use and manipulate. Although some microprocessors have performed BCD arithmetic methods in a sign magnitude representation, they have not utilized a binary adder to operate on multiple digits simultaneously. Thus there is a need for an apparatus and method for packed BCD sign magnitude arithmetic operations wherein the data remains in true digital decimal format and is implemented with a minimum of electronic circuitry.

OBJECTS AND SUMMARY OF THE INVENTION

Accordingly, it is a general object of the present invention to provide an arithmetic method and arithmetic apparatus for providing BCD sign-magnitude arithmetic operation in a data processing system.

It is a particular object of the present invention to provide a method, and an apparatus for carrying out the method, for adding and subtracting encoded packed digits to form the respective decimal digit sum or difference.

The present invention performs arithmetic operations utilizing arithmetic apparatus within a data processing system. In performing an addition, the data processing system storing a BCD encoded addend $A_d$ and a BCD encoded auguend $A_r$ operates on information bytes from low to high order to form a decimal arithmetic sum $S_C$. The information bytes include least and most significant decimal digits each encoded as four BCD bits. Addition steps include preconditioning one of the operands by adding a predetermined binary number to each BCD digit, performing a binary addition, and adjusting to form the decimal sum $S_C$. In subtraction, the two's complement of the subtrahend is added to the minuend, and a decimal adjust is performed to form the decimal difference $D$. Although the present invention utilizes a BCD embodiment, the method and apparatus of the present invention may be utilized with other base number systems having numbers which may be represented by a binary sequence that does not use all of the $2^N$ binary combinations in the set.

DESCRIPTION OF THE DRAWINGS

FIG. 1 shows a block diagram of a basic environmental system suitable for employing the arithmetic method and apparatus of the present invention.

FIG. 2 shows a schematic representation of the data paths and apparatus associated with the execution unit of the system of FIG. 1 wherein arithmetic instructions are executed.

FIG. 3 shows a schematic representation of the data paths and apparatus associated with a generalized execution unit such as the system of FIG. 1 expanded to operate on a variable number of digits simultaneously.

DESCRIPTION OF THE PREFERRED EMBODIMENTS

A basic environmental processing system which is suitable for employing the arithmetic method of the present invention is shown in FIG. 1. Briefly, that system includes a main storage unit 12, a storage control unit 14, instruction unit 16, an execution unit 18, a channel unit 20 with associated I/O and a console 22. In accord with well known principles, the data processing system of FIG. 1 operates under control of a stored program of instructions. Typically, instructions and the data on which the instructions operate are introduced from the I/O equipment via the channel unit 20 through the storage control unit 4 into the main storage unit 12. From the main storage unit 12, instructions are fetched by the instruction unit 16 through the storage control 14 and are decoded to control the execution of instructions. Execution unit 18 executes instructions decoded in the instruction unit 16 and operates upon data communicated to the execution unit from the appropriate location in the system.

The execution unit 18 of the system of FIG. 1 is shown in further detail in FIG. 2. The execution unit has a plurality of units including a byte adder 31, an adder input control 33, and a logic comparison unit LCU 35 for performing logical comparison operations. These functional units may be typically implemented using apparatus and techniques well known in the data processing field. In addition to the functional units, it is to be noted that the byte adder 31 utilized in performing normal binary additions in the system has additional plural carry outputs and carry blocking inputs. Further, adder input control 33 has been expanded to provide additional inputs from gating and storage apparatus in accord with the present invention. Specifically, carry outputs from the byte adder 31 are connected to the signal inputs of intermediates storage flip-flops 42 and 44. Clock inputs are provided to the respective flip-flops 42 and 44. The carry output of flip-flop 42 is connected to a second input of NOR gate 38, the most significant digit (MSD) gate. The output of gate 38 is connected to adder input control 33. The output of flip-flop 44, IDC, is connected to the second input of the least significant digit (LSD) NOR gate 40. The output of gate 40 is connected to the adder input control 33. The first inputs of gates 38 and 40 are connected to a decimal adjust signal DECADJ. The output flip-flop 42, a carry signal, is also connected to the input control 33. An AND gate 46 is provided having inputs connected to the fourth carry output of the adder 31 and connected to the DECADJ signal line. The output of the gate 46 is connected to the carry input to the fifth bit of the adder 31.

It is to be noted that the present invention merely requires the addition of the above mentioned intermediate storage 42 and 44, and gating means 38, 40 and 46 to a conventionally known execution unit for binary addition having only the additional requirements that the carry outputs and carry blocking inputs are provided, and the adder input control can provide the appropriate decimal correction value. The functional units of FIG. 2 are typically implemented using apparatus and techniques well known in the data processing field. In addition to the functional units the execution unit 18 includes a plurality of registers which function to store, to ingate and to outgate data from the various functional units in controlled steps pursuant to executing the programmed instructions of the data processing system of FIG. 1. Specifically these registers include a first register 52 and a second register 54. These registers are included within the normal data processing system and each must be capable of storing one information byte, 8 bits in the present embodiment.

The execution unit 18 additionally includes a control 56 which controls in a conventional manner the ingating, outgating and other timing associated with execution unit 18.

While the general nature of the operation of an execution unit like that of FIG. 1 is well known, certain specific features may now be explained in further detail particularly in connection with the additional apparatus and the arithmetic algorithm of the present invention.

In accord with the present invention a predetermined method including plural steps is executed to form a sum $S_C$ from a given addend $A_d$ and a given augend $A_r$. The problem of utilizing binary computing logic to add or subtract in a given number system other than the base $2^N$ (where N is a positive integer) is general in nature. Conventionally, digits of other based number systems must first be encoded, possibly by assigning a sequence of binary numbers, to represent corresponding digits of a particular number system. For simplicity, the binary number sequence may be assigned beginning with zero and ending with the binary equivalent of the maximum digit in the particular base number system. For example, the correspondence within the well known Binary Coded Decimal (BCD) system wherein the decimal digits from 0 to 9 are assigned a corresponding binary value may be represented as:

| 0 | 0000 |
|---|------|
| 1 | 0001 |
| 2 | 0010 |
| 3 | 0011 |
| 4 | 0100 |
| 5 | 0101 |
| 6 | 0110 |
| 7 | 0111 |
| 8 | 1000 |
| 9 | 1001 |

When adding BCD digits, it is of course desirable that the carry information generated at a particular digit position be processed in a regular and straightforward manner so as to minimize the apparatus required to perform the addition. For example, addition of two digit BCD encoded numbers in a conventional binary adder provides:

```
  28    0010  1000  =  2   8
 +35   +0011  0101  =  3   5
  ---   ----  ----    ---  --
  63    0101  1101     5  13
```

It is to be noted that the low order digit result is 1101, an unassigned number in the set of BCD numbers. Thus to provide a correct decimal sum, a correction must be applied to the result. When correction is required subtracting $10_{10}$ (1010) from the low order position and adding one (0001) to the next higher order digit position yields the proper answer within the BCD assigned number system of (0110 0011).

A general method which would transform the result of a binary addition back into the set of assigned BCD numbers requires an elaborate scheme for testing every digit for values greater then the maximum digit representation, 9 in the BCD case. However, it would be advantageous and desirable if the carry out of a digit position would be included in the next higher order digit as an integral part of the binary addition process. A convenient way to accomplish this is to translate the set of BCD numbers toward the maximum value contained within the set of binary digits used for encoding.

For Binary Coded Decimal:

| Set A | Set C | Set B |
|-------|-------|-------|
| 0 | 0000 | |
| 1 | 0001 | |
| 2 | 0010 | |
| 3 | 0011 | |
| 4 | 0100 | |
| 5 | 0101 | |
| 6 | 0110 | 0 |
| 7 | 0111 | 1 |
| 8 | 1000 | 2 |
| 9 | 1001 | 3 |
|   | 1010 | 4 |
|   | 1011 | 5 |
|   | 1100 | 6 |
|   | 1101 | 7 |
|   | 1110 | 8 |
|   | 1111 | 9 | where Set A is BCD and where Set B is translated BCD.

In Set A adding a 1 (0001) to a 9 (1001) develops an answer within the complete binary Set C, but no useful carry information is generated. On the other hand, if the assigned codes in Set B are used to represent one of the decimal digits, this set when combined with Set A, generates useful carry information. For example, adding a one (0001) in Set A to a 9 in Set B (1111) yields an answer of (0000) with a carry of one. This method is analogous to the conventional decimal add and carry steps:

```
    Set B 9 =        1111              9
 plus Set A 1 =      0001  is like    +1
                  ---------           ----
                  1 0000            1   0
                  Carry             Carry
```

From this analogous operation with BCD digits, it is seen that a preconditioning factor of six (0110) provides the necessary translation.

The above specific example may be more generally expressed:

let $n$ = the number of bits required to hold an encoded digit

Let B = the base of the encoded number system let N = the number of the encoded digit let $C_f$ = the correction factor and the translation factor let $C$ = the carry bit into the next high order digit position then:

$C = 2^x$     by pure binary arithmetic and, $C_f = 2^x - B$     because $C_f$ must translate to the end of the numbers representable in N bits so $C_f = 2^x - B$     and then $C_f + B = 2^x$
$C = 2^x = C_f + B$
$C = C_f + B$ Interpretation of this result provides a general statement:

When a carry is developed from a binary addition of a preconditioned (translated) digit and a non-translated digit, the carry includes the correction factor plus the base value. For the BCD arithmetic case $C_f = 6$ and $B = 10$. Further it is to be noted that when a carry does occur, the correction factor $C_f$ flows along with the carry out of a particular digit position. Thus for the selected set when a carry leaves the digit position the correction factor is removed and the remaining digit is translated back to the original number set, needing no correction. However, when a carry is not generated as a result of the addition, the correction factor, $C_f$, must be removed to return the result to the original number set. The method will be demonstrated later with a specific example.

In carrying out a subtraction operation, the subtraction algorithm need not require the preconditioning of one operand so long as a two's complement conversion is first carried out. The binary adder utilized for the addition may be a two's complement adder to provide this result. It is to be noted that the precondition value or correction factor is thereby provided since the taking of the one's complement of the subtrahend is the same as taking the (B-1)'s complement and adding the correction factor. The binary one added to the one's complement representation in the adder to form the two's complement representation in analogous to the end-around-carry in the (B-1)'s complement representation. By way of example in the BCD system the one's complement of the BCD digit may be seen to form the nine's complement of the BCD digit plus the correction factor:

$7_{10} = 0111$        $\overline{7_{10}} = 1000$
9's complement of $7_{10}$ =   $2_{10}$
correction factor         $+6_{10}$
one's complement of $0111$    $8_{10}$    $=1000$ Thus it is apparent that the above described arithmetic, that is, the addition and subtraction scheme, may be utilized in any base number system having members which are represented by a sequence of binary numbers that do not make use of all the $2^x$ binary combinations available in the set. Of particular interest of course, is the BCD number system. The arithmetic scheme may likewise be utilized in other number systems, such as a base 20 system represented in 5 binary bits and a base 9 system represented in 4 binary bits.

The hardware elements necessary to implement packed digit arithmetic in number systems other than BCD is identical to the hardware elements in FIG. 3. To expand the technique illustrated in FIG. 3 to other number systems the digit carry outputs and inputs must occur at the digit boundaries for the given number system. The structural elements shown have characteristics defined by the following:

let $n$ = the number of bits needed to hold an encoded digit, $m$ = the number of digits to be operated on simultaneously $C_f$ = the correction value The reference callouts shown in FIG. 3, correspond to those of FIG. 2 with the addition of a 100 prefix. Binary adder 131 has a minimum length of mn bits with the carry outputs at the digit boundaries being provided for every n bit position and the carry inputs to all digit boundaries being provided for every n+1 bit position.

AIC 133 is an input control with a minimum length of mn bits capable of ingating the addition and subtraction operands and ingating the correction value, $C_f$, or 0, at each digit position during the decimal adjust instruction. A plurality of m flip-flops 142, 144, . . . are used to store the interdigit carries and are connected through NOR gates 138, 140, . . . to AIC 133.

A plurality of m NOR gates, 138, 140, . . . , are connected to AIC 133 and control the adding of $C_f$ to each decimal adjust instruction. When the output of a NOR gate is 1, $C_f$ is added to the corresponding digit. When the output of a NOR gate is 0, 0 is added to the corresponding digit. An array of (m-1) AND gates, 146, . . . are connected to block interdigit carries to adder 131 during the decimal adjust instruction. Operation of the FIG. 3 apparatus is as previously discussed in conjunction with FIG. 1.

Sign magnitude arithmetic methods of the present invention to calculate decimal sums and differences are in accord with the following steps.

For addition:

Step 1. Load the m least significant digits of the addend and auguend into registers R1 and R2, where m is the number of digits operated on simultaneously.

Step 2. Add the correction value $C_f$ to each encoded digit of the auguend.

Step 3. Binary addition of addend, preconditioned auguend and carry value from lower order m digits.

Step 4. Determine the correction value for each digit sum generated in Step 3.

Step 5. Add correction value to the sum generated in Step 3.

Step 6. Store the sum and repeat Steps 1 through 5 for next m higher order encoded digits.

For subtraction:

Step 1. Load the m least significant digits of the minuend and subtrahend into registers R1 and R2, where m is the number of digits operated on simultaneously.

Step 2. Form two's complement of subtrahend.

Step 3. Binary addition of minuend, complemented subtrahend and borrow from lower order m digits.

Step 4. Determine the correction value for each digit difference generated in Step 3.

Step 5. Add correction value to the sum generated in Step 3.

Step 6. Store the difference and repeat Steps 1 through 5 for the next m higher order encoded digits as necessary to complete the subtraction.

It is to be noted that since the above steps operate on a sign-magnitude number representation, the sign of the answer must be predetermined before the operation is performed. Conventional methods well known to those skilled in the art may be utilized. It is to be noted that the methods outlined in the above steps are entirely consistent with the equations and discussion in the previously described arithmetic algorithm background.

The execution unit 18 of the system of FIG. 1 carries out the above described sign magnitude arithmetic method using the apparatus of FIG. 2. The following steps refer to FIG. 2 and describe the addition process in detail.

In Step 1, the control unit 56 loads from storage the addend $A_d$ into register 52 and the auguend $A_r$ into the register 54.

In Step 2, the auguend is transferred by conventional means under control of control unit 56, from register 54 to the first input of adder 31. A predetermined binary 0110, 0110 is provided at the second input of adder 31. After the addition is completed the total is transferred back to register R1.

In Step 3, the $m$ lower order, least significant digits are gated from register 52 via AIC 33 to adder 31, the current contents of register 54 are similarly gated to the second input of adder 31, and the current content of the carry flip-flop 42 is also gated through the AIC 33 to the adder 31. The sum is gated into register 54. Simultaneously, the clock under control of control unit 56 rises to a logical one thus gating and storing the carry out of the eighth bit of the adder 31 into the carry flip-flop 42 and gating and storing the carry out of the fourth bit of the adder 31, C4 into the IDC flip-flop 44.

In Step 4, the DECADJ control line under control of control unit 56 falls to a low state enabling the $LSD_{10}$ and $MSD_{10}$ control lines, coupling the state of the IDC flip-flop 44 and carry flip-flop 42 to the adder input control 33. The $LSD_{10}$ control line goes to a logical one if the IDC flip-flop 44 is set to a logical zero, and the $MSD_{10}$ control line goes to a logical one if the carry flip-flop 42 is set to a logical zero. When either flip-flop is set to a logical one, the respective control line remains low. The DECADJ control line also blocks the propagation of the carry signal through gate 46 from the fourth to the fifth bit of the adder 31 during the time that it is in a logical one state. The correction value generated by the AIC 33 may have four different values depending on the states of the $LSD_{10}$ and $MSD_{10}$ control lines as shown in the following table.

| $MSD_{10}$ | $LSD_{10}$ | Binary Correction Value |
|---|---|---|
| 0 | 0 | 00000000 |
| 0 | 1 | 00001010 |
| 1 | 0 | 10100000 |
| 1 | 1 | 10101010 |

In Step 5, the contents of register 54 are gated to an input of the adder control and the correction value is simultaneously gated to the other input of adder 31. The summed output of adder 31 is gated to and stored in register 54.

In Step 6, the execution unit stores the contents of register 54 in main storage 12. Steps 1 through 5 are repeated for the next higher order BCD encoded digits until the addition is complete. The final carry generated is the most significant digit of the decimal answer.

The following steps refer to FIG. 2 and describe the subtraction process in detail.

In Step 1, the control unit 56 loads from storage the least significant digits of the minuend into R1 register 54 and the least significant digits of the subtrahend into R2 register 52.

In Step 2, the minuend is transferred from register 54 to the adder 31 under control of the AIC 33. Simultaneously, the subtrahend is transferred from register 52 to the adder 31 where the two's complement of the subtrahend is generated.

In Step 3, the simultaneous binary addition of the minuend, the complemented subtrahend, and the carry from flip-flop 42 is executed in the adder 31. The result is gated back into register 54. The carry (borrow) information from bit 8 of the adder 31 is strobed into the carry flip-flop 42 and the carry out of bit 4 of the adder is strobed into the IDC flip-flop 44.

In Step 4, the DECADJ control line under control of control unit 56 falls to a low state enabling the $LSD_{10}$ and $MSD_{10}$ control lines, coupling the state of the IDC flip-flop 44 and carry flip-flop 42 to the adder input control 33. The $LSD_{10}$ control line goes to a logical one if the IDC flip-flop 44 is set to a logical zero, and the $MSD_{10}$ control line goes to a logical one if the carry flip-flop 42 is set to a logical zero. When either flip-flop is set to a logical one, the respective control line remains low. The DECADJ control line also blocks the propagation of the carry signal through gate 46 from the fourth to the fifth bit of the adder 31 during the time that it is in a logical one state. The correction value generated by the AIC 33 may have four different values depending on the state of the $LSD_{10}$ and $MSD_{10}$ control lines as previously discussed in conjunction with addition Step 4.

In Step 5, the contents of register 54 are gated to an input of the adder control and the correction value is simultaneously gated to the other input of adder 31. The summed output of adder 31 is gated to and stored in register 54.

In Step 6, the execution unit stores the contents of register 54 in main storage 12. Steps 1 to 5 are repeated for the next higher order BCD digits until the subtraction is complete.

SPECIFIC EXAMPLES

Specific examples of the above described respective sign-magnitude addition and subtraction are as follows:

```
Addition
Problem:      5364      0101    0011    0110    0100
             +6932      0110    1001    0011    0010
             -----
             12296
Step 1
Add 6 to Auguend         0101    0011    0110    0100
                         1100    1111    1001    1000
Step 2                1       1       0       0
Binary Addition          0101    0011    0110    0100
                         1100    1111    1001    1000
                         ----    ----    ----    ----
                         0010    0010    1111    1100
Step 3                1
Correct Binary           0010    0010    1111    1100
Result                   0000    0000    1010    1010
                         ----    ----    ----    ----
                         0010    0010    1001    0110

Subtraction
Problem:      7416       0111    0100    0001    0110
             -2345       0010    0011    0100    0101
             -----
             5071
Step 1                1
Binary Subtraction       0111    0100    0001    0110
                         1101    1100    1011    1011
                         ----    ----    ----    ----
                         0101    0000    1101    0001
Step 2
Correct Binary           0101    0000    1101    0001
Result                   0000    0000    1010    0000
                         ----    ----    ----    ----
                         0101    0000    0111    0001
```

Thus it is apparent that there has been provided an improved arithmetic method and arithmetic apparatus for providing BCD sign-magnitude arithmetic operations in a data processing system. Further, there has been provided a method and an apparatus for carrying out the method, for adding and subtracting encoded packed digits to form the respective decimal digit sum or difference.

We claim:

1. A data processing system storing a BCD encoded number N and a BCD encoded number P which are operated upon in low to high order information bytes to form a decimal arithmetic sum and a decimal arithmetic difference where each byte includes least and most significant decimal digits each encoded as four BCD bits, said system comprising,
   a first unit for adding and for two's complementing operands, said unit including an eight bit adder having first and second inputs and having fourth and eighth bit carry outputs and a blocking input for blocking the fourth carry input to the fifth bit,
   an input control unit for directing data to said first unit inputs and providing a predetermined translation value and plural predetermined adjust values,
   a plurality of registers for storing operands including said BCD encoded number N and said BCD encoded number P,
   a carry storage unit for storing the adder carry outputs,
   control means for controlling the processing of operands,
   means, responsive to said control means, for gating an information byte of number N from said registers to the first input of said adder and if the operands are to be added for gating the predetermined operand translation value to the second input of said adder to form a preconditioned sum and connecting said adder to said registers for storing said sum, and if the operands are to be subtracted for forming the two's complement of said information byte of N by said adder,
   means, responsive to said control means, for gating said byte of N and byte of P from the respective registers and the carry from the carry storage to the first and second inputs of said adder to form an initial binary sum and connecting the adder output to said registers for storing said sum, and simultaneously storing the adder carry outputs in said carry storage,
   means, responsive to said control means, for gating to said input control unit the contents of said carry storage to form an adjust value in a predetermined manner,
   means, responsive to said control means, for gating the initial binary sum from said registers and the adjust value to the first and second inputs of said adder to form an adjusted sum, and gating said sum to said registers for storing said adjusted sum.

2. A system as in claim 1 wherein said first unit includes an X bit binary adder having first and second inputs and having carry outputs for every fourth bit carry output of said output and a blocking input for blocking the carry input from every fourth bit carry to the next bit.

3. A data processing system storing a BCD encoded addend $A_d$ and a BCD encoded auguend $A_v$ which are operated upon in low to high order information bytes to form a decimal arithmetic sum $S_a$, where each byte includes least and most significant decimal digits each encoded as four BCD bits, said system comprising,
   an eight bit adder having first and second inputs for the least and most significant BCD digits to be added, said adder having fourth and eighth bit carry outputs and a blocking input for blocking the fourth carry input to the fifth bit,
   an input control unit for directing data to said adder inputs and providing a predetermined translation value and plural predetermined adjust values,
   a plurality of registers for storing operands including said addend $A_d$ and said auguend $A_v$,
   a carry storage unit for storing the adder carry outputs,
   control means for controlling the processing of operands,
   means, responsive to said control means, for gating the auguend from said registers to the first input of said adder and for gating the predetermined operand translation value to the second input of said adder to form a preconditioned auguend sum and connecting said adder to said registers for storing said sum,
   means, responsive to said control means, for gating the preconditioned auguend and the addend from the registers and the carry from the carry storage to the first and second inputs of said adder to form a sum and connecting the adder output to said registers for storing said sum, and simultaneously storing the adder carry outputs in said carry storage,
   means, responsive to said control means, for gating to said input control unit the contents of said carry storage and for generating predetermined adjust values in response thereto,
   means, responsive to said control means, for gating the initial sum from said registers and the adjust values to the first and second inputs of said adder to form an adjusted sum, and gating said sum to said registers for storing said sum.

4. A data processing system storing a BCD encoded subtrahend $S_d$ and a BCD encoded minuend $S_m$ which are operated upon in low to high order information bytes to form a decimal arithmetic difference D, where each byte includes least and most significant decimal digits each encoded as four BCD bits, said system comprising,
   an eight bit adder for adding and two's complementing operands having first and second inputs for the least and most significant BCD digits to be added, said adder having fourth and eighth bit carry outputs and a blocking input for blocking the fourth carry input to the fifth bit,
   an input control unit for directing data to said adder inputs,
   a plurality of registers for storing operands including said subtrahend $S_d$ and said minuend $S_m$,
   a carry storage unit for storing the adder carry outputs,
   control means for controlling the processing of operands,
   means, responsive to said control means, for gating said byte of said subtrahend $S_d$ from said registers to the first input of said adder and for two's complementing said byte of $S_d$, means, responsive to said control means, for gating said byte of said minuend $S_m$ from said registers to the second input of said adder to form a sum, by addition of the two's complement of said byte $S_d$ and said byte of said minuend $S_m$, and connecting the adder output to said registers for storing said sum, and simultaneously storing the adder carry outputs in said carry storage, means, responsive to said control means, for gating to said input control unit the contents of said carry storage and for generating predetermined adjust values in response thereto, means, responsive to said control means, for gating the initial sum from said registers and the adjust values to the first and second inputs of said adder to form an adjusted sum, and gating said sum to said registers for storing said sum, said adjusted sum forming the difference D.

5. A method for arithmetic operation in a data processing system storing a BCD encoded number N and a BCD encoded number P which are operated upon in low to high order information bytes to form a decimal arithmetic sum and a decimal arithmetic difference where each byte includes least and most significant decimal digits each encoded as four BCD bits, said system having a first unit having carry outputs for adding and for two's complementing operands, having an input control unit for directing data to said first unit and providing a predetermined translation value and plural predetermined adjust values, having a plurality of registers for storing operands, having control means for controlling the processing of operands, having a carry storage unit for storing the adder carry outputs, the steps comprising, gating an information byte of number N from said register means to said adder, gating, if the operands are to be added, a predetermined operand translation value to said adder, adding said byte of N and said translation value to form a preconditioned sum and storing said sum in said registers, gating, if the operands are to be subtracted, said byte of N to said adder, two's complementing said byte of N and storing the result thereof, gating said byte of N and byte of P from said registers and said carry storage to the inputs of said adder, adding said inputs to form an initial binary sum and storing said initial sum in said register means, and simultaneously storing the adder carry outputs in said carry storage, gating the contents of said carry storage to said control unit, forming an adjust value in a predetermined manner and storing said value in said register means, gating the initial sum from said registers and adjust value from storage to said adder inputs, adding said initial sum and said adjust value to form an adjusted sum, and storing said sum in said register means.

6. A method for arithmetic operation in a data processing system storing a BCD encoded number N and a BCD encoded number P which are operated upon in low to high order information bytes to form a decimal arithmetic sum and a decimal arithmetic difference where each byte includes least and most significant decimal digits each encoded as four BCD bits, said system having a first unit having carry outputs for adding and for two's complementing operands, having an input control unit for directing data to said first unit and providing a predetermined translation value and plural predetermined adjust values, having a plurality of registers for storing operands, having control means for controlling the processing of operands, having a carry storage unit for storing the adder carry outputs, the steps comprising, if the operands are to be added, adding said byte of N and a predetermined operand translation value to form a preconditioned sum and storing said sum in said registers, if the operands are to be subtracted, two's complementing said byte of N, adding said byte of N and byte of P and said carry outputs to form an initial binary sum and storing said initial sum in said register means, and simultaneously storing the adder carry outputs in said carry storage, forming an adjust value in a predetermined manner and storing said value in said register means, and adding said initial sum and said adjust value to form an adjusted sum, and storing said sum in said register means.

* * * * *